United States Patent [19]

Hoeschele

[11] 4,075,150
[45] Feb. 21, 1978

[54] COMPOSITION FOR CURING POLYURETHANES

[75] Inventor: Guenther Kurt Hoeschele, Wilmington, Del.

[73] Assignee: E. I. Du Pont de Nemours and Company, Wilmington, Del.

[21] Appl. No.: 782,949

[22] Filed: Mar. 30, 1977

[51] Int. Cl.² .................. C08G 18/32; C09K 3/00; C08K 5/52; C08K 5/10
[52] U.S. Cl. .................. 260/30.6 R; 252/182; 260/2.5 AK; 260/2.5 AM; 260/18 TN; 260/31.2 N; 260/31.4 R; 260/31.6; 260/31.8 G; 260/31.8 H; 260/33.2 R; 260/33.6 UB; 260/33.8 UB; 260/37 N; 260/75 NH; 260/77.5 AM
[58] Field of Search .......... 252/188.3 R; 260/75 NH, 260/77.5 AM, 30.6 R, 33.6 UB, 33.8 UB, 31.4 R, 31.2 N, 31.6, 31.8 G, 31.8 H, 33.2 R

[56] References Cited

U.S. PATENT DOCUMENTS

| | | | |
|---|---|---|---|
| 3,876,604 | 4/1975 | Caruso et al. | 260/31.8 S |
| 3,899,438 | 8/1975 | Kalil | 252/182 |
| 3,900,447 | 8/1975 | Van Gulick | 260/77.5 AM |

OTHER PUBLICATIONS

South Africa Patent 74/7320 Abstract, Patent Journal, Nov. 1975, Cross et al.

*Primary Examiner*—H.S. Cockeram

[57] ABSTRACT

A composition having beneficial utility for curing polyurethane prepolymers can be made by (1) forming a mixture of (A) an inert organic liquid and (B) particles of a complex of 4,4'-methylenedianiline and a salt, said mixture containing a small amount of free methylenedianiline, (2) adding to said mixture a small amount of an aromatic monocarbodiimide and (3) allowing said carbodiimide to react with the free methylenedianiline.

14 Claims, No Drawings

COMPOSITION FOR CURING POLYURETHANES

BACKGROUND OF THE INVENTION

This invention relates to compositions useful for curing polyurethane prepolymers, to process for preparing same, and to curable compositions made by mixing the resulting curing agent compositions with isocyanato-terminated prepolymers.

It is known that compositions having utility for curing polyurethane prepolymers can be made by forming a mixture of an inert organic liquid and particles of a complex of 4,4'-methylenedianiline (MDA) and a salt. However, the compositions of this type shown in the prior art have not been entirely satisfactory for many applications. For example, they have had one or more of such drawbacks as (a) too expensive to produce due to the need for subsequent operations to reduce particle size, and (b) poor shelf life of the curing agent/prepolymer mixtures as indicated by their tendency to undergo an undue increase in viscosity during storage. There is a real need in the art for a curing agent which forms mixtures with prepolymers having improved shelf life at room temperature and slightly above, and having the ability to cure rapidly at a suitable elevated temperature to form well-cured polyurethane products.

SUMMARY OF THE INVENTION

The present invention provides a process for preparing a composition which is useful for curing a polyurethane prepolymer comprising
1. forming a mixture of
   A. a substantially inert organic liquid in an amount equal to about 20-90% based on the combined weight of components A and B,
   B. particles of a complex of 3 moles of 4,4'-methylenedianiline and 1 mole of a salt selected from the group: sodium chloride, sodium bromide, sodium iodide, lithium chloride, lithium bromide and lithium iodide,
      said particles being present in an amount equal to about 10-80% based on the weight of the mixture,
      said particles having an average diameter of less than 60 microns,
   said mixture having a free methylenedianiline content of about 0.1-5% by weight,
2. adding to said mixture at least 0.2 equivalent of an aromatic mono-carbodiimide per equivalent of the free methylenedianiline, and
3. allowing said carbodiimide to react with said methylenedianiline.

The invention also provides a composition, useful for curing a polyurethane prepolymer, which comprises
   A. an inert organic liquid as defined in item A of the previous paragraph,
   B. dispersed in component A, particles of a complex of 4,4'-methylenedianiline and a salt, the particles, their size and their amount being as specified in item (B) of the previous paragraph and
   C. the reaction product obtained by adding an aromatic mono-carbodiimide to a mixture of A and B which has a free methylenedianiline content of about 0.1-5% by weight, and allowing said carbodiimide to react with said methylenedianiline, the amount of mono-carbodiimide added being at least 0.2 equivalent per equivalent of free methylenedianiline originally present in said mixture.

Also provided by the invention is a heat-curable composition, useful for preparing cured polyurethane products, which comprises
   I. the composition defined in the previous paragraph and
   II. an isocyanato-terminated prepolymer, the ratio of components I and II being such that the composition contains about 0.7-1.2 equivalents of amine groups per equivalent of NCO groups.

By practicing this invention, one can overcome the various drawbacks of the prior art including those mentioned above.

DESCRIPTION OF PREFERRED EMBODIMENTS

The composition of this invention which is useful for curing a polyurethane prepolymer contains a substantially inert organic liquid in an amount equal of about 20-90%, preferably about 25-60%, based on the combined weight of components A and B (inert liquid and complex particles). This composition can be referred to as a curing agent composition, or simply as a curing agent.

The component A liquid is "substantially inert" in in the sense that it will not cause any harmful degree of dissociation of the component B complex and will not undergo any harmful reaction with the isocyanato groups of the polyurethane prepolymer at the temperatures encountered in preparing and using the composition.

In the majority of applications, one will prefer to select as component A a free-flowing, high-boiling liquid which is readily miscible with the polyurethane prepolymer to be cured and compatible enough with the cured polyurethane obtained so that there will be substantially no exudation of the liquid from the product. It is usually preferred to use a liquid having a boiling point above 200° C. Many of the liquids known in the plastic art as plasticizers can be used as component A of the present composition. For example, many of the plasticizers listed in the following publication can be used: Modern Plastics Encyclopedia, 1975-1976, pp. 692-702, McGraw-Hill Publishers. Especially preferred are di(2-ethylhexyl)phthalate, tetraethylene glycol bis(2-ethylhexanoate), tri(isopropylphenyl) phosphate and blends thereof. Also very useful are other liquids selected from the following types: (1) esters of polycarboxylic acids and monohydric alcohols or phenols, (2) esters of polyols and monocarboxylic acids, (3) low molecular weight linear polyesters prepared from diols and dicarboxylic acids and chain-terminated with monocarboxylic acids or monohydric alcohols, (4) aromatic derivatives selected from biphenyl, terphenyl and diphenyl ether and their halogenated derivatives, (5) chlorinated paraffins having a chlorine content of about 35-65% by weight and a specific gravity of about 1.1-1.5 at 25° C, (6) tertiary phosphoric esters, and (7) aromatic hydrocarbon oils derived from petroleum and having a molecular analysis by the clay-gel method of ASTM D-2007 of about 50-100% by weight aromatic hydrocarbons, about 0-35% by weight saturated hydrocarbons and about 0-30% by weight polar compounds, and blends of two or more such liquids.

It is known in the art that the type (1) liquids mentioned above can be prepared by esterification of an acid such as phthalic, isophthalic, mellitic, adipic, azeleic, sebacic, maleic or fumaric acid with an alcohol such as butyl, isobutyl, 2-ethylhexyl, cyclohexyl or isodecyl alcohol, or by replacing the alcohol with a phenolic compound such as o-cresol or phenol. The type (2) liquids can be prepared by esterifying a polyol such as glycerol, diethylene glycol, tri- or tetra- ethylene glycol, pentaerythritol or dipropylene glycol with an acid such as acetic, 2-ethylhexanoic, caproic, pelargonic or benzoic acid. The type (3) liquids are polyesters of relatively low molecular weight (e.g., below 2000). Examples of the type (6) liquids are triphenyl phosphate, tricresyl phosphate, tri-n-butyl phosphate, tri(2-ethylhexyl) phosphate, octyldiphenyl phosphate and tri(isopropylphenyl) phosphate.

The novel curing agent composition also contains the previously-described component B particles of a complex of 4,4'methylenedianiline and a salt in an amount equal to about 10–80%, preferably about 40–75%, based on the combined weight of components A and B. The salt portion of the complex is preferably sodium chloride. The particles of complex have an average diameter of less than 60 microns, preferably les than 11 microns. The average diameter of the particles can be determined by using a photomicrograph method known to be useful for measuring small particles.

In preparing the present composition, one forms a mixture of the component A inert liquid and the component B particles. The resulting mixture as used in this invention contains about 0.1–5%, preferably about 0.4–3%, of free methylenedianiline (MDA) based on the weight of the mixture. The concentration of free MDA is largely a function of the purity of the complex and the particular inert liquid used to prepare the dispersion. Regardless of the purity of the complex and the choice of the inert liquid, the resulting mixtures have always been found to contain some free MDA.

A preferred method for preparing the mixture of inert liquid A and complex particles B is the efficient and economical method taught by Kalil in U.S. Pat. No. 3,899,438. This method comprises carrying out the complex-forming reaction between 4,4'-methylenedianiline and the salt in the presence of an inert organic liquid of the type described above plus at least 0.5 part of water per 100 parts of the salt, the amount of water present being not enough to dissolve all the salt until the complex-forming reaction is at least 50% complete. For use in this invention, the water is removed from the resulting dispersion. Any suitable known method can be used; for example, by subjecting the dispersion to a vacuum at about 60°–70° C. Dispersions formed by the Kalil method contain a small amount of 2,4'-MDA and 2,2'-MDA in addition to the 4,4'-MDA as the free diamines unless pure 4,4'-MDA is used as a starting material. The 2,4'-MDA and 2,2'-MDA cannot be separated economically from 4,4'-MDA; and commercial MDA normally contains about 2–3% of those impurities. The 2,4'-MDA and 2,2'-MDA are not capable of complex formation and remain in solution in the inert liquid along with the free 4,4'-MDA normally found in dispersions of the complex.

The mixture of components A and B can also be prepared by other methods known to be useful for making dispersions of the complex particles in an inert organic liquid. For example, one can use the method taught by Caruso and Verbanc in U.S. Pat. No. 3,876,604. This method comprises forming particles of the above-described complex of MDA and a salt in a separate operation, then, combining said particles with an inert organic liquid of the type described above, and agitating the resulting combination until a uniform dispersion of the particles in the liquid is obtained, using sufficient shearing or grinding means to insure that the complex particles have the desired small diameter. In this procedure, most of the 2,4'-MDA and 2,2'-MDA are separated out when the complex is prepared. The resulting dispersion still contains free 4,4'-MDA.

After one has formed the specified mixture of components A and B, the preparation of the novel composition is continued by adding to said mixture at least 0.2 equivalent, preferably about 0.3–1-equivalent, of an aromatic mono-carbodiimide per equivalent of the free MDA present in the mixture. The carbodiimide is allowed to react with the free MDA. One can use more than one equivalent of the carbodiimide (e.g., about 1.1–1.3 equivalents); however, it is generally advisable for economic reasons to use 1 equivalent or less.

It is especially preferred to use di-o-tolylcarbodiimide as the carbodiimide. However, any other known aromatic mono-carbodiimide can also be used, for example diphenyl carbodiimide or di-p-tolyl carbodiimide.

As yet, there is no complete understanding of what reactions take place in the mixture when the mono-carbodiimide is added. It appears, however, that the main reaction which takes place is the reaction between the carbodiimide and the free MDA of the mixture to form a triaryl guanidine.

The present curing agent composition preferably also contains an oil-soluble surfactant in an amount equal to about 0.1–5.0% based on the total weight of the composition. Preferred surfactants include lecithin, polyoxypropylated quaternary ammonium halides and phosphated glycerides (e.g., "Emcol"D70-30C from Witco Chemical Corp.).

As indicated above, the present invention also provides a new and beneficially useful heat-curable composition obtained by mixing the novel curing agent composition with an isocyanto-terminated prepolymer. This heat-curable composition has desirable utility for the manufacture of cured polyurethane products. In preparing this composition, the curing agent composition and the prepolymer are blended in proportions such that the resulting mixture contains about 0.7–1.2, preferably about 0.85–1.1, equivalents of amine groups per equivalent of NCO groups. To illustrate the weight ratio of components one could use in typical applications, about 10–60 grams of curing agent composition could be mixed with 100 grams of isocyanato-terminated prepolymer when using a curing agent composition having a 50:50 weight ratio of inert organic liquid to particles of a complex of 3 moles of MDA and 1 mole of sodium chloride.

The prepolymer of this heat-curable composition is preferably the product of reacting a molar excess of an organic diisocyanate with a polyalkylene ether glycol or a polyester glycol having a molecular weight of about 300–3000 and optionally with a diol having a molecular weight of less than 250. Other known isocyanato-terminated prepolymers (which are sometimes referred to in the art as polyurethane prepolymers) can also be used, as will be apparent to one skilled in polyurethane chemistry. In preparing the prepolymer, it is preferred to use about 1.2–4.0 moles (with particular preference for about 1.5–2.5 moles) of the diisocyanate for each mole of glycol plus diol used. Examples of useful organic diisocyanates are 2,4- and 2,6-tolylene diisocyanates, 4,4'-methylenebis(phenyl isocyanate), 4,4'-methylenebis(cyclohexyl isocyanate), hexamethylene diisocyanate and isophorone diisocyanate. Part of the diisocyanate (e.g., about 1-25% by weight) can be replaced with a tri-isocyanate, for example, 2,4,4'-triisocyanato-diphenylether. Examples of useful meterials with which the organic isocyanate can be reacted to form the prepolymer are a polyalkylene glycol (e.g., polyethylene ether glycol, polypropylene ether glycol or polytetramethylene ether glycol); a polyether made by copolymerizing a cyclic ether (e.g., ethylene oxide, propylene oxide, trimethylene oxide or tetrahydrofuran) with an aliphatic polyol (e.g., ethylene glycol, 1,3-butanediol, diethylene glycol, dipropylene glycol, 1,2-propylene glycol or 1,3-propylene glycol); a polyester glycol made by polymerizing a cyclic lactone (e.g., $\epsilon$-caprolactone) in the presence of a diol, or by the condensation polymerization of a dicarboxylic acid (or its ester-forming equivalent) and a molar excess of a polyol; or a blend of two or more such materials. Examples of these and other materials which can be used to prepare the prepolymer will be apparent from such prior art as Hoeschele U.S. Pat. No. 2,984,645, Columns 5 and 6, and the references listed by Caruso and Verbanc in U.S. Pat. No. 3,876,604, Column 6, lines 46–48.

The composition can also contain one or more additives such as those known to be useful in curable polyurethane prepolymer compositions, for example coloring agents, fillers, solvents, stabilizers, antisettling agents, and pore-forming agents (see Cross & Horeman South African Pat. No. 74/7320).

The present invention enables one to prepare compositions having beneficial utility for the curing of polyurethane prepolymers. For example, curing agent compositions are obtainable according to this invention which can be prepared economically by a process which employs a minimum of operations, and which can be mixed with polyurethane-prepolymers to form heat-curable compositions having (1) the ability to be stored for a reasonable period of time at temperatures below 80° C without showing an undue increase in viscosity plus (2) the ability to be cured rapidly to form high quality cured polyurethane products when heated (e.g., about 80°–180° C). It is an important advantage to be able to obtain a curable composition of this type which will retain a useful low viscosity for an extended period of time, regardless of whether the mixture of components A and B used to form the curing agent composition is prepared by the economical procedure described by Kalil in U.S. Pat. No. 3,899,438 or by the useful procedure taught by Caruso and Verbanc in U.S. Pat. No. 3,876,604.

The following examples illustrate the invention; all amounts are by weight unless otherwise indicated. All Brookfield viscosity values are obtained by using an RVT model viscometer. The viscosities of the heat-curable compositions are measured at low and high viscometer spindle speeds because the compositions are thixotropic and viscosity is a function of shear rate.

EXAMPLE 1

A composition which is useful for curing polyurethane prepolymers is prepared economically by (1) forming a mixture of 225 g of di(2-ethylhexyl) phthalate, 19.5 g sodium chloride, 64 g water, 1.48 g of lecithin and 7.52 g of a polyoxypropylated quaternary ammonium chloride which is understood to have the formula

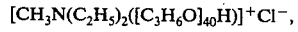

sold as "Emcol" CC42 by Witco Chemical Corp., (2) while the resulting mixture is agitated under high shear conditions in a Waring blender, adding 198 g of flaked 4,4'-methylenedianiline, (3) continuing the high shear mixing of the composition for one hour while maintaining its temperature at 58°–60° C by regulating the shear input by means of a "Variac", (4) removing the water from the resulting dispersion of complex particles in the organic liquid by distillation in an agitated flask at 60° C under subatmospheric pressure, (5) adding 5 parts of di-o-tolyl carbodiimide to 100 parts of the resulting dispersion with agitation at 26° C and (6) allowing the dispersion to stand for four days at 30°–35° C.

The particles of the dispersion obtained in step (4) are particles of a complex of 3 moles of MDA and 1 mole of sodium chloride. These particles are found to have an average diameter of less than 11 microns when examined in a customary manner by means of a photomicrograph. There is no need for further operations to reduce the size of the particles since they are already fine enough for most applications.

The dispersion obtained in step (4) has a free MDA content of 2.25%. This result is obtained by separating the complex particles from the liquid phase by means of a high-speed centrifuge (15000 rpm) and then analyzing the clear liquid for MDA content by potentiometric titration with 0.1 N 2,4-dinitrobenzene-sulfonic acid in acetic acid.

The dispersion obtained in step (4) also has an aminonitrogen content of 6.1% and a Brookfield viscosity (100 rpm at 26° C) of 1.25 Pa·s (pascal-second).

The dispersion obtained in step (6), in which the carbodiimide has reacted with the free MDA, has a Brookfield viscosity (100 rpm at 26° C) of 2.24 Pa·s.

The use of the curing agent composition obtained in Example 1 for preparing a cured polyurethane is demonstrated in Example 2.

EXAMPLE 2

A heat-curable composition of this invention which is useful for the manufacture of cured polyurethane products is prepared by mixing 37.5 parts of the curing agent composition obtained in step (6) of Example 1 with 100 parts of the isocyanato-terminated prepolymer described below at 26° C. The resulting composition is allowed to stand at 26° C in a tightly-sealed glass jar under nitrogen.

The prepolymer in this composition is the product of reacting 2 moles (348.4g) of tolylene-2,4-diisocyanate (2,4-TDI) with 1 mole (1000 g) of polytetramethylene ether glycol (PTMEG) whose number average molecular weight is 1000 under agitation at 80° C for 4 hours in a dry reaction vessel protected from atmospheric moisture. The resulting polyurethane prepolymer has a free NCO group content of 6.4% and a Brookfield viscosity (100 rpm at 30° C) of 6 Pa·s.

The heat-curable composition of this example is degassed at 50° C under subatmospheric pressure, and test samples are cured in a hot compression mold for 1 hour at 130° C. The resulting cured polyurethane of Example 2 has properties shown below in Table I.

Experiment 2A

For purposes of comparison, a heat-curable composition outside the invention is prepared by repeating Example 2 except the carbodiimide is omitted from the curing agent composition. This is done by mixing 34.0 parts of the curing agent composition obtained in step (4) of Example 1 with 100 parts of the prepolymer of Example 2 at 26° C. The resulting composition is degassed and test samples are cured in the manner described in Example 2. The cured polyurethane of Experiment 2A has the properties shown in Table I.

It will be apparent from Table I that the properties of the Example 2 cured material do not differ very much from the properties of the Experiment 2A cured material. A successful cure and good properties are obtained with both materials; the carbodiimide addition in preparing Example 2 material does not prevent obtaining good cure and good quality in the product.

TABLE I

|  | Cured Product of | |
| --- | --- | --- |
|  | Example 2 | Experiment 2A |
| $T_B$, MPa | 30.7 | 27.9 |
| $E_b$, % | 550 | 600 |
| $M_{100}$, MPa | 6.2 | 6.6 |
| $M_{200}$, MPa | 8.2 | 8.0 |
| $M_{300}$, MPa | 11.2 | 10.2 |
| Split tear, kN/m | 59.5 | 65.7 |

In Table I, $T_B$ means tensile strength at break, $E_b$ means elongation at break, $M_{100}$, $M_{200}$, $M_{300}$ mean modulus at an elongation of 100%, 200% and 300% respectively. All these values are obtained by ASTM Method D-412, using a cross-head speed of 50.8 cm per minute. Split tear is obtained by ASTM Method D-470, but modified by using a 3.81 cm × 7.6 cm sample with a 3.81 cm cut on the long axis of the sample. This configuration prevents "necking down" at the point of tearing. Cross-heat speed is 127 cm per minute. Results are given in SI units (International System). MPa means megapascal; kN/m means kilonewtons/meter.

Experiment 2B

For purposes of comparision, to illustrate the important beneficial utility characteristics of the Example 2 composition, Brookfield viscosity values as a function of storage time are obtained on curable compositions freshly prepared as described in Example 2 (carbodiimide added to the curative) and in Experiment 2A (no carbodiimide added).

TABLE II

|  | Curable Composition of | |
| --- | --- | --- |
|  | Example 2 | Experiment 2A |
| Brookfield viscosity at 2.5 rpm, 26° C, Pa·s | | |
| Storage time | | |
| 10 min. | 9.76 | 10.40 |
| 80 min. | 13.60 | 44.32 |
| 6 hrs. | 14.56 | 58.40 |
| 24 hrs. | 27.20 | 94.40 |
| Brookfield viscosity at 100 rpm, 26° C, Pa·s | | |
| Storage time | | |
| 10 min. | 10.00 | 9.45 |
| 80 min. | 13.00 | 20.16 |
| 6 hrs. | 13.90 | 24.16 |
| 24 hrs. | 18.00 | 29.84 |

It will be noted that the Example 2 composition undergoes a much smaller increase in viscosity than the Experiment 2A composition under the conditions shown above. When a heat-curable composition is prepared in the manner described in Example 2 except the curing agent composition obtained in step (6) of Example 1 is allowed to stand at 26° C for thirty days before it is mixed with the isocyanato-terminated prepolymer, and then viscosity values as a function of storage time are obtained on the resulting composition in manner described in Experiment 2B, the viscosity values are substantially the same as those shown for Example 2 composition in Table II. The 30-day storage of the carbodiimide-modified curing agent composition causes no significant change in the utility of the composition.

When a curing agent composition is prepared in the manner described in Example 1 except the 5 parts of di-o-tolyl carbodiimide used in step (5) are replaced with 4.4 parts of diphenyl carbodiimide, the resulting composition has about the same kind of utility as the Example 1 composition. About the same kind of results are obtained when the carbodiimide used in step (5) is replaced with 5.0 parts of di-p-tolyl carbodiimide.

EXAMPLE 3

A composition which is useful for curing polyurethane prepolymers is prepared by (1) providing a quantity of particles of a complex of 3 moles of MDA and 1 mole of sodium chloride, made by a known process (see the teaching of Caruso & Verbanc in U.S. Pat. No. 3,876,604, Column 2, line 55 to Column 3, line 35), (2) ball-milling 50 parts of the complex particles of step (1) with 50 parts of di(2-ethylhexyl) phthalate and 1 part of lecithin at 30° C in an intermittent type attriter (from Union Process Inc., Akron, Ohio) provided with water cooling for 5 hours, (3) adding 1.5 parts of di-o-tolyl carbodiimide to 150 parts of the resulting dispersion with agitation at 26° C and (4) allowing the dispersion to stand for four days at 30°-35° C.

The complex particles of the resulting composition have an average diameter of less than 20 microns. The composition obtained in step (2) has a free MDA content of 0.5%, an amino-nitrogen content of 6.3% and a Brookfield viscosity (100 rpm at 25° C) of 1.67 Pa·s.

A heat-curable composition which is useful for the manufacture of cured polyurethane products is prepared by mixing 33.9 parts of the curing agent composition obtained in step (4) with 100 parts of the isocyanato-terminated prepolymer described in Example 2 at 50° C. The resulting composition is stored in friction-top cans in a 50° C oven, and the viscosity measurements are made at intervals as indicated below in Table III.

Experiment 3A

For purposes of comparison, a heat-curable composition outside the invention is prepared by mixing 33.3 parts of the curing agent composition obtained in step (2) of Example 3 with 100 parts of the prepolymer described in Example 2 at 50° C. The resulting composition is stored and tested for viscosity in the same manner as the Example 3 composition; the viscosity values are shown below in Table III.

TABLE III

|  | Curable Composition of | |
| --- | --- | --- |
|  | Example 3 | Experiment 3A |
| Brookfield viscosity at 2.5 rpm, 50° C, Pa·s | | |
| Storage Time | | |
| 10 min. | 2.88 | 4.00 |
| 24 hrs. | 4.00 | 58.40 |
| 11 days | 8.80 | 144.00 |
| 30 days | 16.30 | too viscous to measure |
| Brookfield viscosity at 100 rpm, 50° C, Pa·s | | |
| Storage time | | |
| 10 min. | 2.32 | 2.40 |
| 24 hrs. | 2.90 | 12.40 |
| 11 days | 5.20 | 29.40 |
| 30 days | 6.90 | too viscous to measure |

It is an important advantage of the Example 3 composition that it undergoes a much smaller increase in viscosity than the Experiment 3A composition under the conditions shown above.

EXAMPLES 4–7

The curing agent compositions described in Table IV below which are useful for curing polyurethane prepolymers are prepared in the manner described in Example 3 except (a) in step (2) the di(2-ethylhexyl) phthalate is replaced with tetraethylene glycol bis(2-ethylhexanoate), and (b) step (3) consists of adding the amount of di-o-tolylcarbodiimide shown in Table IV to 100 parts of the dispersion of complex particles in organic liquid obtained in step (2). The complex particles of the resulting composition have an average diameter of less than 10 microns. The number of equivalents of carbodiimide added per equivalent of free MDA present for each composition, and the Brookfield viscosity at 100 rpm, are shown in Table IV.

The Experiment 4A composition shown in Table IV is prepared as described for Examples 4–7 except no carbodiimide is added.

TABLE IV

| Curing Agent Composition | Example | | | | Experiment |
|---|---|---|---|---|---|
| | 4 | 5 | 6 | 7 | 4A |
| Parts of complex/organic liquid dispersion | 100 | 100 | 100 | 100 | 100 |
| Parts of di-o-tolyl carbodiimide | 4.0 | 2.0 | 1.6 | 1.32 | — |
| Equiv. of carbodiimide per equiv. free MDA | 1.0 | 0.5 | 0.4 | 0.33 | — |
| Brookfield viscosity (100 rpm at 26° C) Pa·s | 1.71 | 1.77 | 1.41 | 1.30 | 0.84 |

EXAMPLES 8–11

Heat-curable compositions which are useful for the manufacture of cured polyurethane products are prepared by mixing the amount of the curing agent compositions of Examples 4–7 shown below in Table V with 100 parts of the isocyanato-terminated prepolymer described in the next paragraph at 22° C. The resulting compositions are stored in tightly-sealed bottles at 26° C, and viscosity measurements are made at intervals as indicated in Table V.

The prepolymer used in making the compositions of Examples 8–11 is prepared in the same manner as the prepolymer of Example 2 except the 2 moles of 2,4-TDI are replaced with 2 moles of a mixture composed of 80% tolylene-2,4-diisocyanate and 20% tolylene-2,6-diisocyanate. The resulting polyurethane prepolymer has a free NCO group content of 6.4% and a Brookfield viscosity (100 rpm at 30° C) of 6 Pa·s.

Experiment 8A

For purposes of comparison, a heat-curable composition outside the invention is prepared by mixing 34.3 parts of the curing agent composition of Experiment 4A with 100 parts of the prepolymer described in the previous paragraph at 22° C. The resulting composition is stored and tested for viscosity in the same manner as the Example 8 composition, and the viscosity values are recorded in Table V.

TABLE V

| | Example | | | | Experiment |
|---|---|---|---|---|---|
| Curable Composition of | 8 | 9 | 10 | 11 | 8A |
| Curing Agent Composition of | 4 | 5 | 6 | 7 | 4A |
| Parts of curing agent/100 parts prepolymer | 37.0 | 35.7 | 35.2 | 35.0 | 34.3 |
| Brookfield viscosity at 2.5 rpm, 26° C, Pa·s Storage Time | | | | | |
| 10 min. | 8.00 | 6.72 | 6.88 | 8.80 | 138.40 |
| 1 hr. | — | 9.60 | 19.84 | 30.72 | 328.00 |
| 2 hrs. | 9.92 | — | — | 35.20 | TVTM* |
| 5 hrs. | 10.72 | 11.36 | 21.40 | — | TVTM |
| 24 hrs. | 23.20 | 16,60 | 59.50 | 126.00 | TVTM |
| Brookfield Viscosity at 100 rpm, 26° C, Pa·s | | | | | |
| 10 min. | 7.60 | 6.64 | 7.00 | 8.64 | 33.10 |
| 1 hr. | — | 8.24 | 13.00 | 16.68 | 72.40 |
| 2 hrs. | 9.28 | — | — | 18.00 | TVTM |
| 5 hrs. | 9.68 | 9.92 | 14.56 | — | TVTM |
| 24 hrs. | 14.24 | 13.10 | 22.80 | 37.80 | TVTM |

*Too viscous to measure

It can be seen that the compositions of Examples 8–11 undergo a much smaller increase in viscosity than the Experiment 8A composition under the conditions shown above. Thus, there is a significant improvement in processing characteristics, even in the embodiments of Example 9–11 wherein less than 1 equivalent of carbodiimide is used per equivalent of free MDA.

Heat-curable compositions prepared as described in Example 8 and Experiment 8A are degassed at 50° C under subatmospheric pressure, and test samples (1.9 mm-thick slabs) are cured in a hot compression mold for 1 hour at 100° C. The resulting cured polyurethane samples have the properties shown in Table VI.

TABLE VI

| | Cured Product of | |
|---|---|---|
| | Example 8 | Experiment 8A |
| $T_B$, MPa | 29.0 | 32.8 |
| $E_B$, % | 580 | 560 |
| $M_{100}$, MPa | 7.3 | 8.3 |
| $M_{300}$, MPa | 11.7 | 12.5 |
| Split tear, kN/m | 55.5 | 49.9 |

As indicated by the properties shown in Table VI, fully-cured test samples of polyurethane having very useful properties are obtained with both compositions. Thus, the carbodiimide addition in preparing the Example 8 material does not prevent obtaining good cure and quality.

EXAMPLE 12

A composition which is useful for curing polyurethane prepolymers is prepared by (1) providing a quantity of particles of a complex of 3 moles of 4,4'-methylenedianiline and 1 mole of sodium chloride, made by a known process as described in U.S. Pat. No. 3,876,604, (2) ball-milling the following for five hours in the apparatus used in step (2) of Example 3: 120 parts of the particles of step (1) with 116 parts of isopropylated triaryl phosphate ("Kronitex-100" from FMC Corp., understood to be tri(isopropylphenyl)phosphate), 4 parts of a polyoxypropylated quaternary ammonium chloride which is understood to have the formula shown in step (1) of Example 1 except the number 40 is replaced with 25 (sold as "Emcol" CC36 by Witco Chemical Corp.), and 2.4 parts of an anti-setting agent composed of montmorillonite clay modified with an organic additive ("Bentone" 38 from NL Industries, Hightstown, N.J.), (3) adding 14.35 parts of di-o-tolyl carbodiimide to 1024 parts of the dispersion obtained in step (2) with agitation at 26° C and (4) allowing the composition to stand for 12 days at 22° C.

The composition obtained in step (2) has a free MDA content of 1.25%, an amino-nitrogen content of 6.4% and a Brookfield viscosity (100 rpm at 23° C) of 1.24

Pa·s. The composition obtained in step (4) has a Brookfield viscosity (same method) of 3.90 Pa·s.

A heat-curable composition which is useful for the manufacture of cured polyurethane products is prepared by mixing 34 parts of the curing agent composition obtained in step (4) with 100 parts of the prepolymer described in Example 8 at 26° C. The resulting composition is stored in tightly-sealed bottles at 26° C, and viscosity measurements are made at intervals as indicated in Table VII.

Experiment 12A

For purposes of comparison, a heat-curable composition outside the invention is prepared by mixing 33 parts of the curing agent composition obtained in step (2) of Example 12 with 100 parts of the Example 8 prepolymer at 26° C. THe resulting composition is stored and tested for viscosity in the same manner as the Example 12 composition, and the viscosity values are recorded in Table VII.

TABLE VII

| | Curable Composition of | |
|---|---|---|
| | Example 12 | Experiment 12A |
| Brookfield Viscosity at 2.5 rpm, 26° C, Pa·s Storage Time | | |
| 10 min. | 12.48 | 55.20 |
| 1 hr. | 17.10 | 129.00 |
| 5 hrs. | 20.14 | 262.00 |
| 24 hrs. | 48.32 | 390.00 |
| Brookfield Viscosity at 100 rpm, 26° C, Pa·s | | |
| 10 min. | 11.20 | 22.70 |
| 1 hr. | 12.48 | 34.90 |
| 5 hrs. | 14.68 | 65.70 |
| 24 hrs. | 24.04 | 114.00 |

It can be seen that the composition of Example 12 undergoes a much smaller increase in viscosity than the Experiment 12A composition under the conditions shown above. Thus, the invention provides a marked improvement in certain important processing characteristics of the curable composition.

I claim:

1. A process for preparing a composition which is useful for curing a polyurethane prepolymer comprising
   1. forming a mixture of
      A. a substantially inert organic liquid in an amount equal to about 20–90% based on the combined weight of components A and B,
      B. particles of a complex of 3 moles of 4,4'-methylenedianiline and 1 mole of a salt selected from the group: sodium chloride, sodium bromide, sodium iodide, lithium chloride, lithium bromide and lithium iodide,
         said particles being present in an amount equal to about 10–80% based on the weight of the mixture,
         said particles having an average diameter of less than 60 microns,
      said mixture having a free methylenedianiline content of about 0.1–5% by weight,
   2. adding to said mixture at least 0.2 equivalent of an aromatic mono-carbodiimide per equivalent of the free methylenedianiline, and
   3. allowing said carbodiimide to react with said methylenedianiline.

2. A composition, useful for curing a polyurethane prepolymer, which comprises
   A. a substantially inert organic liquid in an amount equal to about 20–90% based on the combined weight of components A and B,
   B. dispersed in component A, particles of a complex of 3 moles of 4,4'-methylenedianiline and 1 mole of a salt selected from the group: sodium chloride, sodium bromide, sodium iodide, lithium chloride, lithium bromide, and lithium iodide,
      said particles being present in an amount equal to about 10–80% based on the combined weight of components A and B,
      said particles having an average diameter of less than 60 microns, and
   C. the reaction product obtained by adding an aromatic mono-carbodiimide to a mixture of A and B which has a free methylenedianiline content of about 0.1–5% by weight, and allowing said carbodiimide to react with said methylenedianiline, the amount of monocarbodiimide added being at least 0.2 equivalent per equivalent of free methylenedianiline originally present in said mixture.

3. A composition according to claim 2 wherein component A is a liquid selected from the group: esters of polycarboxylic acids and monohydric alcohols or phenols, esters of polyols and monocarboxylic acids, low molecular weight linear polyesters prepared from diols and dicarboxylic acids and chain-terminated with monocarboxylic acids or monohydric alcohols, aromatic derivatives selected from biphenyl, terphenyl and diphenyl ether and their halogenated derivatives, chlorinated paraffins having a chlorine content of about 35–65% by weight and a specific gravity of about 1.1–1.5 at 25° C, tertiary phosphoric esters, and aromatic hydrocarbon oils derived from petroleum and having a molecular analysis by the clay-gel method of ASTM D-2007 of about 50–100% by weight aromatic hydrocarbons, about 0–35% by weight saturated hydrocarbons and about 0–30% by weight polar compounds.

4. A composition according to claim 2 wherein component A is a liquid selected from the group: di(2-ethylhexyl)phthalate, tetraethylene glycol bis(2-ethylhexanoate), and tri(isopropylphenyl) phosphate.

5. A composition according to claim 2 wherein the component A content is about 25–60%

6. A composition according to claim 2 wherein the salt of component B is sodium chloride.

7. A composition according to claim 2 wherein the amount of component B particles is 40–75% by weight of A + B.

8. A composition according to claim 2 wherein the component B particles have an average diameter of less than 11 microns.

9. A composition according to claim 2 wherein the mono-carbodiimide of component C is di-o-tolylcarbodiimide.

10. A composition according to claim 2 wherein the amount of carbodiimide added is about 0.3–1 equivalent per equivalent of free methylenedianiline present.

11. A composition according to claim 2 which also contains an oil-soluble surfactant in an amount equal to about 0.1–5.0% based on the total weight of the composition.

12. A heat-curable composition, useful for preparing cured polyurethane products, which comprises
   I. the composition defined in claim 2 and
   II. an isocyanato-terminated prepolymer, the ratio of components I and II being such that the composition contains about 0.7–1.2 equivalents of amine groups per equivalent of NCO groups.

13. A composition according to claim 12 wherein there are about 0.85–1.1 equivalents of amine groups per equivalent of NCO groups.

14. A composition according to claim 12 wherein said prepolymer is the product of reacting a molar excess of an organic diisocyanate with a polyalkylene ether glycol or a polyester glycol having a molecular weight of about 300–3000 and optionally with a diol having a molecular weight of less than 250.

* * * * *